United States Patent Office 3,328,157
Patented June 27, 1967

3,328,157
PRESERVATION OF CUT FLOWERS
Ernest V. Darpinian, 921 Yale Ave.,
Modesto, Calif. 95350
No Drawing. Filed Nov. 18, 1964, Ser. No. 412,234
7 Claims. (Cl. 71—2.7)

This invention relates to the treatment of cut flowers such as roses to preserve their fresh and natural appearance for prolonged periods of time following the severence of the roses from the growing plant.

A number of products are commercially available for preserving and enhancing the natural appearance of cut flowers. In general, these products are designed for addition to the water within which the stems of the cut flowers are placed. The products vary in their achievement of the goals for which they are designed and frequently produce little or no effect.

Cut roses, especially those that are several days old, represent a special group of cut flowers that are particularly troublesome to the commercial florist. These roses may be in cold storage for two to five days before being sold and delivered to a customer. It is of course highly desirable when the customer places the flowers in a vase or otherwise displays them for decorative purposes that the flowers be, in fact, decorative in appearance. Unfortunately when the roses have been cut for several days and stored, and particularly in hot summer weather, it often happens that the roses fail to open and almost immediately wilt. Discoloration of expensive varieties which were cultivated for their color may simultaneously occur. Use of the various commercial products now available does not ameliorate the situation with the regularity required by the practicalities of the business world.

The present invention has been tested and proven to have a profound and consistent beneficial effect upon the life and preservation of the natural appearance of the cut flowers well beyond the usual expected life of the flowers. This is true even in the case of flowers that have already been stored for several days after cutting before being treated in accordance with this invention. In particular, much success has been found with the heretofore difficult to preserve roses.

In short, the present invention comprises a method for treating the cut flowers by inserting the cut ends of the stems in a solution of dimethyl sulfoxide in water. With a suitable concentration of the solution and by leaving the cut ends of the flowers beneath the surface of the solution for a suitable period of time the desired preservation is achieved in all respects including color, form, aroma, and generally fresh appearance. Roses that have been treated by this method invariably open and remain fresh looking for substantial periods of time. Premature wilting and similar deterioration of the flower is prevented.

While the precise mechanism by which the dimethyl sulfoxide solution performs its function is not completely understood, it is believed that by placing the cut end of the stem under the level of the treatment fluid the solution proceeds up the channels in the flower stem. It is believed that the dimethyl sulfoxide opens these channels sufficiently to allow water to reach the extremities of the flower. The presence of the water is responsible for the long lasting, fresh, natural appearance. In the absence of the dimethyl sulfoxide it is believed that the channels are not properly opened and that the water normally used in the vase or other container for the flowers does not adequately reach the extremities of the flower. It should be understood that the foregoing is a possible explanation but the invention should not be construed as being limited thereby.

In carrying out the method, it is only necessary that the cut end of the flower be immersed beneath the fluid level. One-quarter inch or so of the stem may do the job, although as a practical matter it might be that a third or more of the stem will be placed in the solution.

The chemical in the solution will produce the desired effect in a reasonable period of time depending upon the flowers and other environmental factors. It has been found in many cases that about one-half hour in the solution will produce the desired effect, although the period may be somewhat shorter or longer with comparable results being obtained.

Following immersion in the solution for the requisite time the flowers can be removed from the treating solution and placed in fresh water if desired or they may be left in the solution indefinitely although there is no need to do so. If the flowers are removed the treating solution may then be recycled and used for the treatment of subsequent batches of cut flowers.

The concentration of the solution is important. When the concentration of the dimethyl sulfoxide is too low, little or no effect may be observed. On the other hand, extremely highly concentrated solutions would serve no useful purpose, especially if the concentration approaches 100% so that adequate water is not available to penetrate through the channels of the stem. In general, good results have been found with solutions of about 4–5% by volume dimethyl sulfoxide in water although some variation from this figure, particularly upwardly, may also produce the desired result.

As an example of the surprising results that can be obtained, the following experiment with cut roses is offered.

Example

Roses which had been cut some four to five days prior to treatment and kept during tthat time under refrigeration were selected. The roses were inserted in a narrow container with about one-third of the cut stems under the surface of the solution. The solution had been preliminarily made up to comprise 8 cubic centimeters of dimethyl sulfoxide in two quarts of water. The roses were left in the solution for about half an hour and were then removed and the stems placed in fresh water. The so treated roses opened and lasted for more than two days while retaining a very natural and fresh appearance in all respects.

By way of comparison, roses of the same age following cutting and stored under refrigeration but which were not treated with the dimethyl sulfoxide solution, when placed in the same ambient atmosphere failed to open at all and drooped and looked unattractive within a matter of a few hours.

While the above description is in terms of flowers such as roses, it is contemplated that the invention is broadly applicable to cut plants in general. The term "cut flowers" as used throughout this specification and claims should be construed broadly to include both ornamental flowers such as roses as well as vegetables.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for preserving a cut flower, the preserving steps consisting essentially of: immersing the cut end of the stem of the flower in an aqueous solution of dimethyl sulfoxide of sufficient concentration and for a sufficient time to substantially prolong the retention of the natural appearance of the flower.

2. A method for preserving a cut flower, the preserving steps consisting essentially of: immersing the cut end of the stem of the flower in an aqueous solution of dimethyl sulfoxide of sufficient concentration and for a sufficient time for the solution to migrate up the flower stem, open its channels and allow water to reach the extremities of the flower and thereby substantially prolong the retention of the natural appearance of the flower, and then placing the cut end of the so treated flower in fresh water.

3. A method for preserving a cut flower, the preserving steps consisting essentially of: immersing the cut end of the stem of the flower in an aqueous solution of dimethyl sulfoxide of a concentration by volume of at least 4% dimethyl sulfoxide for sufficient time to substantially prolong the retention of the natural appearance of the flower.

4. A method for preserving a cut flower comprising: immersing the cut end of the stem of the flower in an aqueous solution of dimethyl sulfoxide of a concentration by volume of about 4–5% for about one-half hour and then placing the so treated flower stem in fresh water.

5. A method in accordance with claim 4 wherein said flower is a rose.

6. A method for treating a cut rose comprising: placing the cut end of the stem of a rose that has been stored for about to to five days after cutting in about a 4% by volume solution of dimethyl sulfoxide in water for at least about one-half hour, and then placing the cut end of the stem in fresh water whereby the rose will thereafter open and remain fresh looking and natural for at least two days.

7. A method in accordance with claim 6 wherein said dimethyl sulfoxide solution is recycled and the stems of more cut roses are placed therein.

References Cited

UNITED STATES PATENTS 3,137,582   6/1964   Szczesniak _____ 99—192

LEWIS GOTTS, *Primary Examiner.*

ELBERT L. ROBERTS, JAMES O. THOMAS, Jr.,
*Assistant Examiners.*